US012275272B1

(12) United States Patent
Garland

(10) Patent No.: US 12,275,272 B1
(45) **Date of Patent: *Apr. 15, 2025**

(54) APPARATUS FOR CLEANING PAINT APPLICATOR BRUSHES

(71) Applicant: Brian Garland, Fort Lauderdale, FL (US)

(72) Inventor: Brian Garland, Fort Lauderdale, FL (US)

( * ) Notice: Subject to any disclaimer, the term of this patent is extended or adjusted under 35 U.S.C. 154(b) by 57 days.

This patent is subject to a terminal disclaimer.

(21) Appl. No.: 18/453,530

(22) Filed: Aug. 22, 2023

Related U.S. Application Data

(63) Continuation of application No. 17/387,379, filed on Jul. 28, 2021, now Pat. No. 11,731,453.

(60) Provisional application No. 63/057,623, filed on Jul. 28, 2020.

(51) Int. Cl.
*B44D 3/00* (2006.01)
*A46B 17/06* (2006.01)
*B08B 3/02* (2006.01)

(52) U.S. Cl.
CPC .............. *B44D 3/006* (2013.01); *A46B 17/06* (2013.01); *B08B 3/02* (2013.01); *A46B 2200/202* (2013.01)

(58) Field of Classification Search
None
See application file for complete search history.

(56) References Cited

U.S. PATENT DOCUMENTS

| | | | |
|---|---|---|---|
| 2,713,868 | A | 7/1955 | Lewis |
| 2,831,448 | A | 4/1958 | Anderson |
| 3,037,516 | A | 6/1962 | Leach |
| 3,075,534 | A | 1/1963 | Habostad |
| 3,421,527 | A | 1/1969 | Dettman |
| 3,428,060 | A | 2/1969 | Spivey |
| 3,688,785 | A | 9/1972 | Stevens et al. |
| 3,897,797 | A | 8/1975 | Wright et al. |
| 4,155,230 | A | 5/1979 | Lacher |
| 4,377,175 | A | 3/1983 | Fritz |
| 4,672,987 | A | 6/1987 | Brandt |
| 4,708,152 | A | 11/1987 | Hibberd |
| 4,733,679 | A | 3/1988 | Dolcater |
| 4,766,755 | A | 8/1988 | Allen |
| 4,809,722 | A | 3/1989 | Pennise |
| 5,005,598 | A | 4/1991 | Hodgdon |
| 5,050,626 | A | 9/1991 | Brockage et al. |
| 5,184,637 | A | 2/1993 | Kowis |
| 5,544,668 | A | 8/1996 | Dollar |
| 5,839,459 | A | 11/1998 | Bisby |

(Continued)

*Primary Examiner* — Rita P Adhlakha
(74) *Attorney, Agent, or Firm* — Mark D. Bowen, Esq.; Malin Haley DiMaggio & Bowen, P.A.

(57) ABSTRACT

An apparatus for cleaning a paint application roller brush includes a generally cylindrical transparent main body sized for removably receiving the paint application roller brush a first end including end fitting in sealing engagement with the main cylindrical body and adapted with a water inlet adapted with a manually actuated on/off valve, a second end including an end fitting in sealing engagement with the main cylindrical body and adapted with a removable cap, a cap adapted with at least one aperture forming a water outlet, and a flexible inner liner disposed in surrounding relation with the paint applicator roller whereby pressure applied to said liner causes the liner to compress the paint application roller brush.

8 Claims, 4 Drawing Sheets

(56) References Cited

U.S. PATENT DOCUMENTS

| | | | | |
|---|---|---|---|---|
| 8,505,562 | B2 | 8/2013 | Mcphee, III | |
| 2015/0328657 | A1* | 11/2015 | Kenny, Jr. | B08B 3/04<br>134/198 |
| 2020/0079138 | A1* | 3/2020 | Quinn | B44D 3/125 |

* cited by examiner

APPARATUS FOR CLEANING PAINT APPLICATOR BRUSHES

CROSS REFERENCE TO RELATED APPLICATIONS

This application is a continuation of U.S. patent application Ser. No. 17/387,379, filed on Jul. 28, 2021, now U.S. Pat. No. 11,731,453, which claims the benefit of provisional U.S. Patent Application Ser. No. 63/057,623, filed on Jul. 28, 2020.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to rollers used to apply paint, and more particularly to an apparatus for cleaning paint from recently used paint application roller brushes with minimal water usage.

2. Description of Related Art

The popularity of latex-based paint and similar water-soluble paints has led to the development of paint applicator cleaning apparatus to allow for repeated use of the applicator. Although paint applicators come in many forms, the most commonly used applicators are cylindrical rollers covered with a fibrous mat or the like which is dipped into the paint whereafter the paint may be applied to the surface by back and forth rolling action. This method of painting has essentially become standard practice with professional painters. Upon completion, the applicator roller must be cleaned if it is to be used again. The rollers are typically cleaned in a bucket or sink and it requires substantial time and effort to thoroughly remove all of the paint from the fibrous applicator material.

As a result of the difficulty in cleaning paint application rollers, the background art reveals a number of devices specifically designed to assist in the cleaning process. U.S. Pat. No. 2,713,868, issued to Lewis discloses a cleaner for paint applicator rollers that hooks directly to a hose bibb and sprays water onto the fibrous mat material to flush away paint. U.S. Pat. No. 2,831,448, issued to Anderson, discloses an apparatus for cleaning paint rollers that comprises a cylindrical housing into which the roller is placed and an elongate spray tube sprays water onto the roller. U.S. U.S. Pat. No. 3,037,516, issued to Leach, discloses a paint roller washer that clips to a bucket and has an opening to allow a hose to spray water over the roller. U.S. Pat. No. 3,421,527, issued to Dettman, discloses a paint roller cleaning aid comprising a double walled cylindrical structure wherein the inner wall includes spray apertures for spraying water onto a roller received within the cylindrical cleaning aid. U.S. Pat. No. 3,482,060, issued to Spivey, discloses an apparatus for cleaning paint rollers having an impeller and spray conduit. U.S. Pat. No. 4,809,722, issued to Pennise, discloses a paint roller cleaner having a spiral water supply conduit.

The paint applicator roller devices disclosed in the background art are burdened by a host of limitations and disadvantages that have prevented widespread commercial acceptance and use. For example, the devices of the background art typically comprise basic housings specifically sized for just one size of roller and configured for attachment to a water supply to flush or spray water over a paint applicator roller received therein. Those devices are thus limited to use with a single size roller and nap configuration. Further, the devices of the background art require excessive water usage as they merely flushing water over, or spray water onto, the roller rather than force water flow through the nap material. In view of the limitations and disadvantages in the art, there exists a need for advancements in the art of paint roller cleaning apparatus.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

BRIEF SUMMARY OF THE INVENTION

The present invention overcomes the limitations and disadvantages present in the background art by providing an improved apparatus for rapidly cleaning paint from recently used paint applicator rollers ("paint rollers") with minimal water usage. A paint applicator roller cleaning apparatus in accordance with the present invention includes a generally cylindrical main body sized for removably receiving a paint roller disposed therein. The main cylindrical body includes an elongate tubular central portion, which may be formed of a suitable transparent material, and terminating at opposing first and second ends. The first end includes an end fitting in sealing engagement with the main cylindrical body and adapted with a water inlet configured for threaded connection to a water supply hose, such as a common garden hose. The second end includes an end fitting in sealing engagement with the main cylindrical body and adapted with a removable cap disposed in threaded engagement therewith. A paint applicator roller may be longitudinally inserted into the cylindrical main body and secured therein by installation of the cap. The interior of the main cylindrical body is further adapted with a flexible inner liner disposed in surrounding relation with the inserted paint applicator roller. One or more conduits place the region between the inner liner and the cylindrical main body in fluid communication with the water inlet. With a paint applicator roller installed and a source of pressurized water supplied to the water inlet, water flows through the cylindrical main body and exits through an outlet aperture formed in the end cap. Placing the region between the inner liner and the cylindrical main body in fluid communication with the water inlet causes water pressure to compress the liner around the roller brush thereby forcing water to flow directly through the nap material which greatly enhances cleansing effectiveness by reducing both the cleaning time and the amount of water required to remove virtually all of the paint from the roller. Since the inner liner is compressed by water pressure into contact with the roller, the present invention may be used with rollers of various different sizes/diameters, and different nap configurations.

Accordingly, it is an object of the present invention to provide advancements in the field of paint applicator roller brush cleaning.

It is another object of the present invention to provide an apparatus for cleaning paint applicator roller brushes of various sizes and diameters.

Still another object of the present invention is to provide an apparatus for cleaning paint applicator roller brushes using a minimal amount of water.

In accordance with these and other objects, which will become apparent hereinafter, the instant invention will now be described with particular reference to the accompanying drawings.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

In describing this invention, the word "connected" is used. By "connected" is meant that the article or structure referred to is joined, either directly, or indirectly, to another article or structure. By "indirectly joined" is meant that there may be an intervening article or structure imposed between the two articles which are "connected". "Directly joined" means that the two articles or structures are in contact with one another or are essentially continuous with one another. By adjacent to a structure is meant that the location is near the identified structure.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
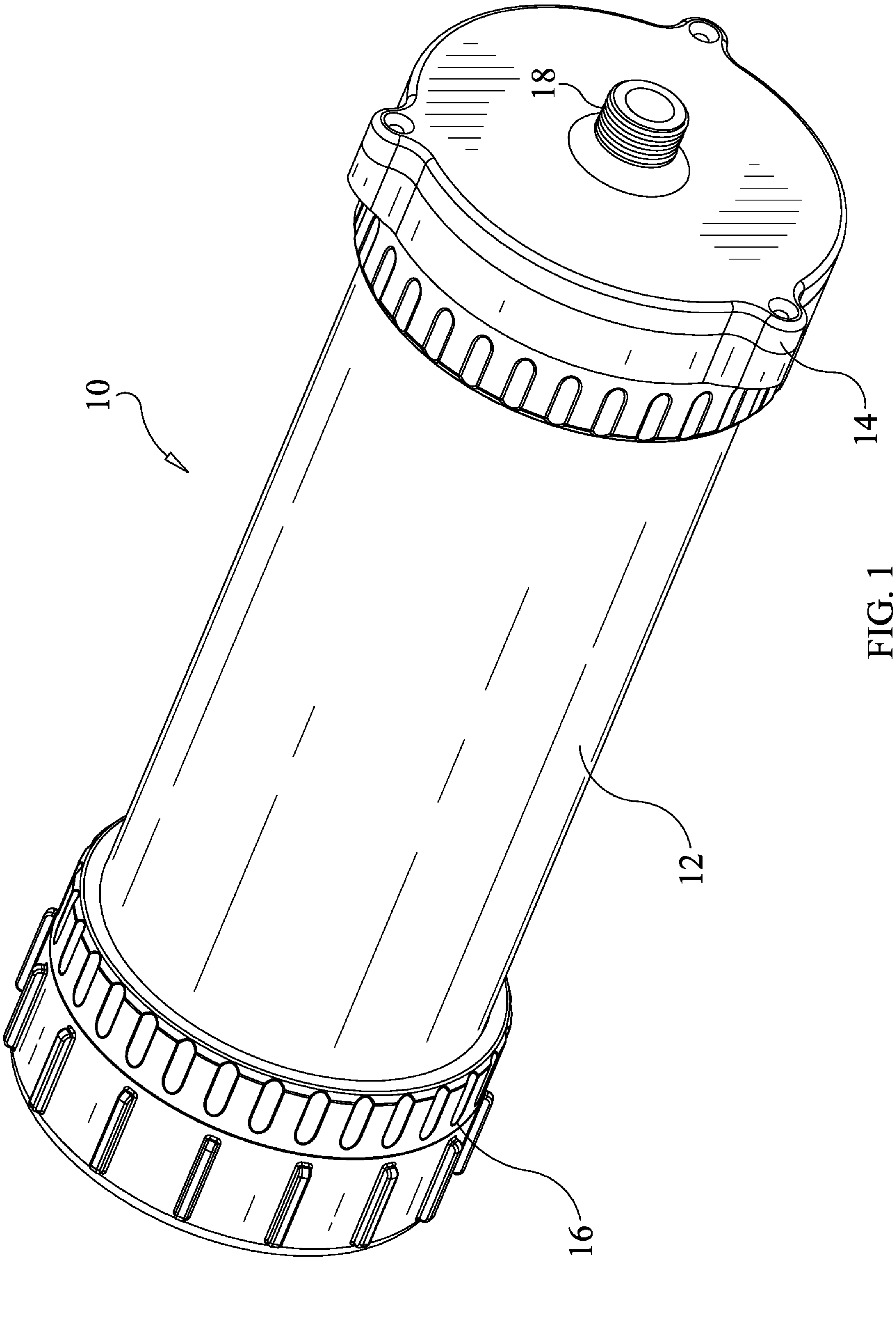
FIG. 1 is a perspective inlet end view of a paint roller brush cleaning apparatus in accordance with the present invention.
Figure 2:
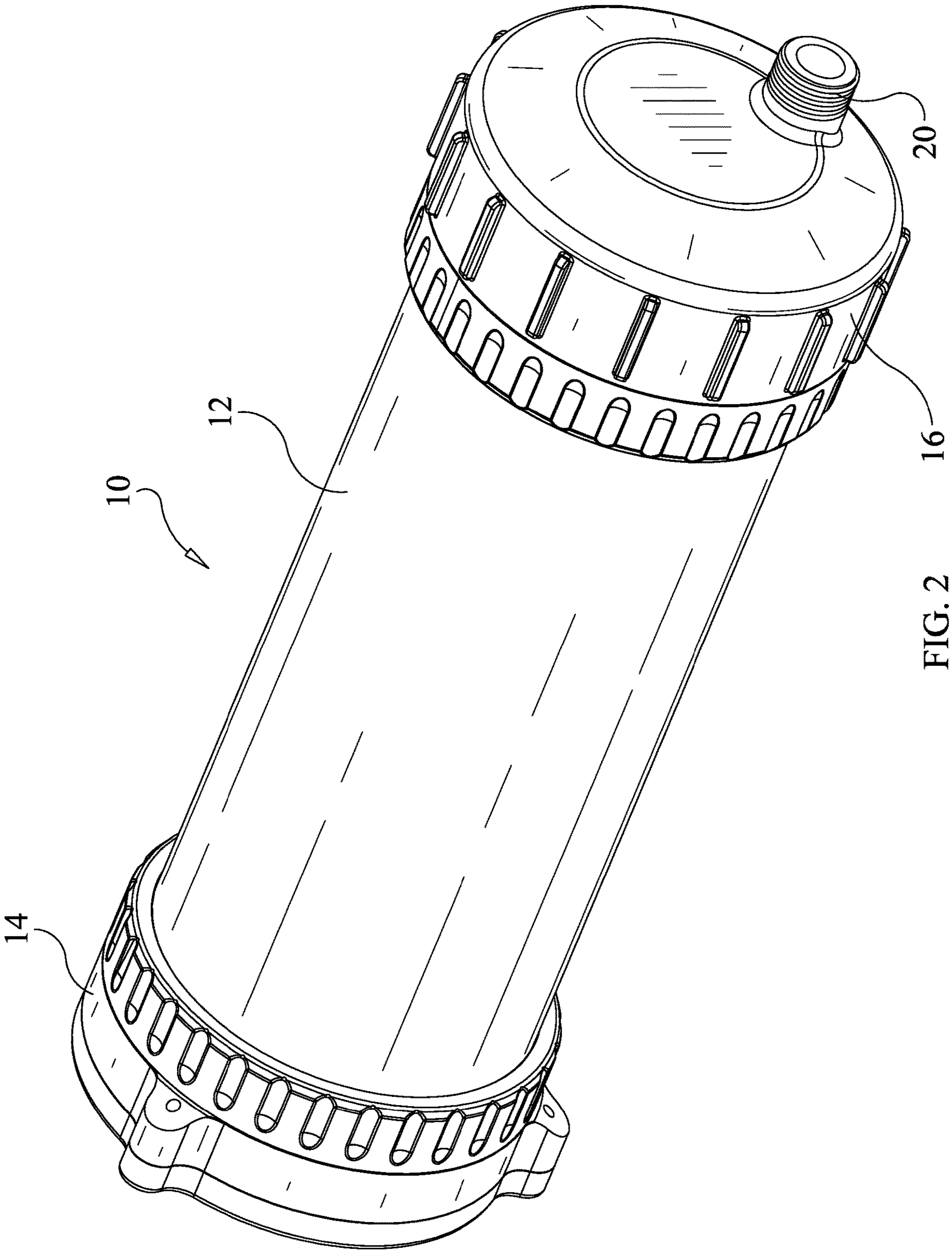
FIG. 2 is a perspective outlet end view thereof.

Turning now to the drawings, FIGS. 1-4 depict an apparatus, generally referenced as 10, for rapidly cleaning paint from recently used paint applicator rollers ("paint rollers") with minimal water usage. As best seen in FIGS. 1 and 2, paint roller cleaning apparatus 10 includes a generally tubular main body 12 sized for removably receiving a pain roller disposed therein. An inlet cap 14 is removably connected to a first end of main body 12 and an outlet cap 16 is removably connected to an opposing second end of main body 12. The connection of end caps 14 and 16 to main body 12 is preferably accomplished by threaded engagement, however, any other connection configuration is considered within the scope of the present invention. End caps 14 and 16 may be single piece components, or may comprise an assembly of components. Inlet end cap 14 preferably defines a clean water inlet fitting 18 formed by a threaded end fitting adapted for threaded connection to a water supply hose, such as a conventional garden hose.

Tubular main body 12 may be formed of a suitable transparent material, such as a clear plastic or Acrylic, or by a non-transparent material such as PVC. Forming the tubular cylindrical tubular central portion of body 12 with a transparent material allows the user to see the cleaning process and judge when the paint roller is sufficiently clean. When formed of non-transparent material the user may still determine when the roller brush is sufficiently cleaned based on whether the water exiting the device is clear. Inlet and outlet end caps 14 and 16 are preferably fabricated from PVC, or any other suitable material. Inlet end cap 14 preferably defines a clean water inlet fitting 18 formed by a threaded end fitting adapted for threaded connection to a water supply hose, such as a conventional garden hose. A manually actuated on/off valve (not shown) may be provided to allow the user to selectively control the flow of water through inlet 18 and inlet end cap 14 into main body 12. Water entering main body 12 flows through cleaning apparatus 10 and exits a dirty water outlet 20 formed on outlet cap 16 to allow for the discharge of "dirty water", namely a mixture of water and paint removed from the roller brush disposed within cleaning apparatus 10. Outlet 20 may comprise a threaded connector for mating engagement with an outlet hose.

Figure 3:
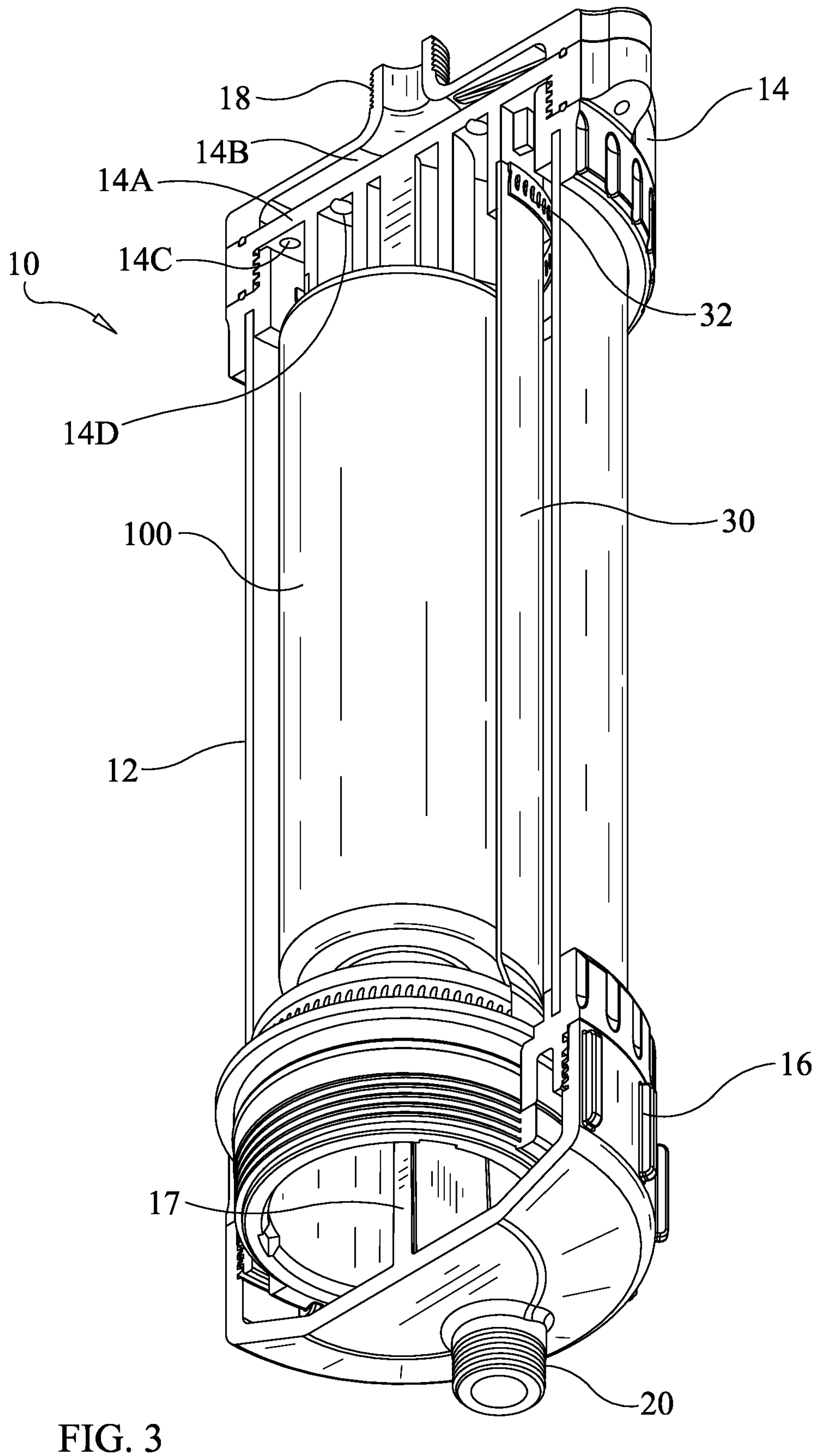
FIG. 3 is a partial sectional view thereof.
Figure 4:
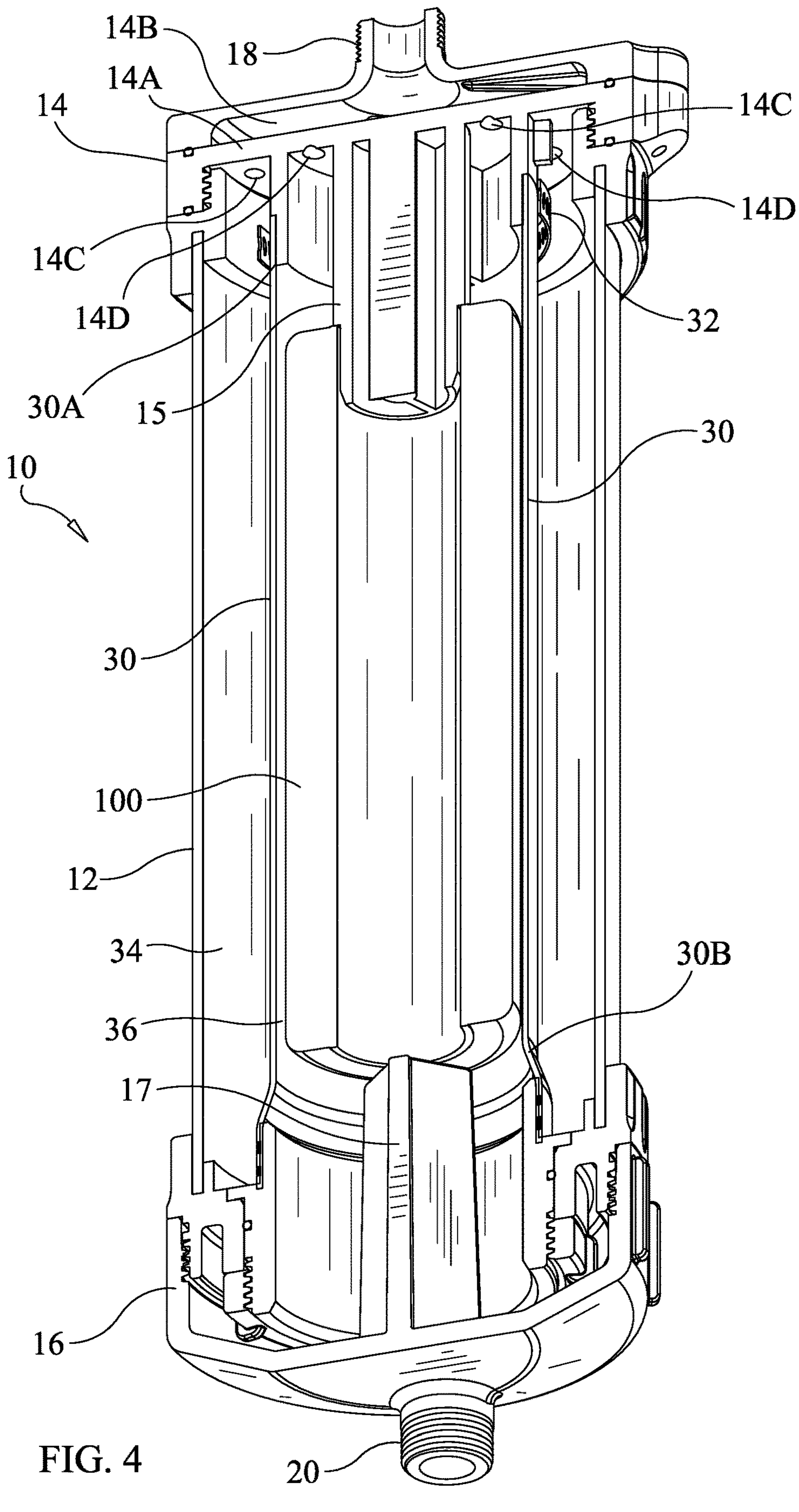
FIG. 4 is a full sectional view thereof.

FIGS. 3 and 4 are sectional views illustrating a paint applicator roller, generally referenced as 100, longitudinally disposed within tubular main body 12 and secured therein by installation of first and second end caps 14 and 16. Inlet and outlet end caps 14 and 16 each include axially projecting lugs, referenced as 15 and 17 respectively, that are received within the axial opening of the paint roller brush 100. Lugs 15 and 17 effectively plug the central axial paint roller opening to prevent water from flowing through the center of the paint roller thereby forcing water to flow through the roller nap as more fully explained herein.

A significant aspect of the present invention involves providing an apparatus that is capable of efficiently cleaning a paint applicator roller brushes using a minimal amount of water and further being able to clean a variety of roller brush sizes and nap configurations. These aspects are achieved by providing a tubular flexible inner liner 30 disposed within tubular main body 12 and configured in surrounding relation with paint application roller 100. Inner liner 30 is preferably fabricated from a flexible waterproof material. Inner liner 30 has a top end 30A connected to first inlet end cap 14 by a clamping mechanism 32, and a bottom end 30B in sealing engagement with a portion of outlet end cap 16. Accordingly, inner liner 30 divides the interior of main body 12 into radially outer and inner chambers, referenced as 34 and 36 respectively. Inlet cap 14 includes a transverse divider 14A that forms a first chamber 14B downstream of inlet fitting 18 wherein water enters the apparatus. Transverse divider 14A further defines apertures 14C and 14D that allow water to flow past transverse divider 14A. Apertures 14C are in fluid communication with radially outer chamber 34, and outer chamber 34 is not in fluid communication with discharge outlet 20 thereby causing outer chamber 34 to become pressurized whereby the introduction of pressurized cleaning water into apparatus 10 causes inner liner to deform and compress on the roller 100. This feature allows apparatus 10 to accept paint rollers of various diameters and nap sizes since inner liner will automatically conform to the rollers of various radiuses and nap thicknesses. Radially inner chamber 36 is in fluid communication with inlet 18, via apertures 14D, and outlet 20 thereby allowing water to through the roller nap/fibers between the inner surface of liner 30 and the roller body upon which the nap is affixed. Compressing liner 30 around roller brush 100 forces water to flow directly through the nap material which greatly enhances cleansing effectiveness by reducing both the cleaning time and the amount of water required to remove virtually all of the paint from the roller. As noted above, water is prevented from passing through the roller brush axial opening by projecting lugs 15 and 17. By forcing the water through the nap, as opposed to just spraying water on the nap, residual paint is carried away through discharge 20 significantly faster than would be realized by the unpressurized flow of water over the paint roller. As a result, the present invention has been found to completely clean a brush in approximately 1.0 minute using a mere 1.5 gallons of water.

The present invention may further be adapted for use with conventional (non-roller) paint brushes by adapting the shape of cylindrical main body 12 into non-tubular shape, such as an oval or rectangular configuration. In accordance with this embodiment, inner liner 30 is also shaped into a corresponding oval or rectangular configuration suitable to receive a conventional paint brush. Thus with minor modification within the scope of the invention, an alternate embodiment is contemplated for use with non-cylindrical brushes such as conventional hand held bristle brushes. In addition the present invention may be adapted for use in cleaning of flushing many other items, including towels, application pads, sponges, articles of clothing.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An apparatus for cleaning a paint roller brush having a tubular main body defining an axial aperture and a radially exterior nap affixed thereto, said apparatus comprising:
- an main body having an inlet end and an outlet end, and defining an interior volume disposed between said inlet end and said outlet end;
- said inlet end having a water inlet;
- an outlet end having a water outlet;
- a flexible inner liner disposed within said interior volume and dividing said interior volume into an outer chamber and an inner chamber, whereby said inner liner is sized to receive the paint roller brush therein with said inner liner disposed in surrounding relation therewith;
- said outer chamber in fluid communication with said inlet but not in fluid communication with said outlet;
- said inner chamber in fluid communication with said inlet and said outlet, whereby water pressure developed in said outer chamber causes said inner liner to compress around said pain roller brush thereby forcing water through the nap to remove residual paint therefrom.

2. The apparatus for cleaning a paint roller brush according to claim 1 wherein said main body is transparent.

3. The apparatus for cleaning a paint roller brush according to claim 1 further including at least one lug disposed relative to the paint roller prevent the flow of water through the axial aperture of the main body of the roller brush.

4. The apparatus for cleaning a paint roller brush according to claim 1 wherein said main body is tubular.

5. The apparatus for cleaning a paint roller brush according to claim 1 wherein said main body is configured in a non-tubular shape.

6. An apparatus adapted for connection to a water hose to clean a paint brush, said apparatus comprising:
- a main body having a water inlet end and a water outlet end, and defining an interior volume;
- an inlet cap connected to said inlet end, said inlet cap including a clean water inlet fitting adapted to be connected to the water hose to permit water flow through said inlet cap and said main body;
- an outlet cap connected to said outlet end, said outlet cap including a water outlet fitting to allow water to discharge from said main body;
- a flexible inner liner disposed within said interior volume and dividing said interior volume into an outer chamber and an inner chamber;
- said inner liner sized to receive the paint brush therein with said inner liner in surrounding relation therewith;
- said outer chamber in fluid communication with said inlet fitting;
- said inner chamber in fluid communication with said inlet fitting and said outlet fitting, whereby water pressure developed in said outer chamber is applied to said liner causing the inner liner to compress the paint brush thereby forcing water through the brush.

7. An apparatus adapted for connection to a water hose to clean a paint brush according to claim 6 wherein said paint brush is a roller brush.

8. An apparatus adapted for connection to a water hose to clean a paint brush according to claim 6 wherein said paint brush is a conventional paint brush.

* * * * *